US005965056A

United States Patent [19]

Okuyama et al.

[11] Patent Number: 5,965,056

[45] Date of Patent: Oct. 12, 1999

[54] RADIO WAVE ABSORBENT

[75] Inventors: Hiroshi Okuyama; Yutaka Saito, both of Akita, Japan

[73] Assignee: TDK Corporation, Tokyo, Japan

[21] Appl. No.: 09/017,210

[22] Filed: Feb. 2, 1998

[30] Foreign Application Priority Data

Feb. 6, 1997 [JP] Japan .................................... 9-038422

[51] Int. Cl.[6] .............................. C04B 35/26; H01P 1/26; H01Q 17/00

[52] U.S. Cl. .................................... 252/62.59; 252/62.56; 252/62.55; 252/62.3 R; 252/62.3 BT; 342/1; 342/2; 342/4; 219/736; 219/744; 250/515.1; 250/518.1; 423/594; 174/35 R

[58] Field of Search ....................... 342/1, 2, 4; 219/736, 219/744; 250/515.1, 518.1; 423/594; 174/35 R; 252/62.56, 62.3 R, 62.3 BT, 62.59, 62.55

[56] References Cited

U.S. PATENT DOCUMENTS

| | | | |
|---|---|---|---|
| 3,720,951 | 3/1973 | Naito | 342/1 |
| 4,731,286 | 3/1988 | Yamashita et al. | 428/329 |
| 4,990,202 | 2/1991 | Murata et al. | 156/89 |
| 5,310,598 | 5/1994 | Yoshinaka et al. | 428/328 |
| 5,476,728 | 12/1995 | Nakano et al. | 428/692 |
| 5,711,893 | 1/1998 | Park | 252/62.62 |
| 5,775,810 | 7/1998 | Shin | 374/176 |
| 5,906,768 | 5/1999 | Kakinuma et al. | 252/62.62 |

FOREIGN PATENT DOCUMENTS 52-19046 2/1977 Japan .

*Primary Examiner*—Joseph D. Anthony
*Attorney, Agent, or Firm*—Oblon, Spivak, McClelland, Maier & Neustadt, P.C.

[57] ABSTRACT

A radio wave absorbent comprises an Ni—Cu—Zn base ferrite having a major composition comprising 49 to less than 50 mol % of $Fe_2O_3$, 32 to 35 mol % of ZnO, 3 to 9 mol % of CuO and 9 to 14 mol % of NiO. The radio wave absorbent further contains an additive molybdenum oxide in an amount of greater than 0 to 0.10 wt %, calculated as $MoO_3$, with the proviso that the total amount of the major composition is 100 wt %. The radio wave absorbent may be used as an exterior or interior material for a building or structure.

3 Claims, 1 Drawing Sheet

RADIO WAVE ABSORBENT

BACKGROUND OF THE INVENTION

The present invention relates generally to a radio wave absorbent used to prevent TV, and radio interferences (ghosts, etc.) and to constitute an anechoic chamber, and more particularly to a radio wave absorbent using an Ni—Cu—Zn base ferrite.

Various interference problems are found to arise in the reception of radio waves used for public broadcasting such as television, and radio broadcasting as well as for mobile communications. Among others, interferences due to radio waves reflected at buildings, bridges, and mobile bodies such as vehicles (especially high-speed mobile vehicles such as those on the Shinkansen Line)—which have been introduced through urbanization and with the advancement of traffic networks—appear in the form of ghosts in the case of televisions and in the form of multipath errors in the form of FM radios, offering a leading cause of making the utilization of media worse or doing damage to mobile communications.

Radar used for airport controls, etc., on the other hand, is now subject to structural limitations. For instance, search waves are reflected at radar structures, causing interferences, and to avoid such situations there may be no choice but to restrict the zone to be searched.

To prevent interferences caused by such reflected waves, a radio wave absorbent is used. The radio wave absorbent is also used as a material for constituting a so-called anechoic chamber which enables a wave-free environment to be achieved within a certain building.

Among such radio wave absorbents known so far in the art, there is an Ni—Cu—Zn base ferrite magnetic material represented by $MFe_2O_4$ where M is Mn, Ni, Cu, Zn, Mg or Co, as typically disclosed in JP-A 52-19046. A radio wave absorbent having such composition has a matching thickness of about 6.4 to 7.4 mm, and is found to show an attenuation of 20 dB or more at a frequency band of 50 to 400 MHz.

In this connection, when a radio wave absorbent is used for exterior or interior finish work for a certain structure, it must be processed in conformity with the contour, standard, etc. of the structure. For instance, when radio wave absorbent panels are used on the outer wall of a certain building, they may be spaced away from each other or may not be located at predetermined positions unless they are processed with a constant dimensional accuracy. However, conventional radio wave absorbents are susceptible to chipping or cracking upon processing or execution due to their low mechanical impact resistance. This, in turn, makes yields worse, resulting in cost increases.

A radio wave absorbent offers a problem in connection with matching thickness when used as an exterior material, etc. for a huge structure such as a building or bridge. That is, when a radio wave absorbent is used as the exterior material for such a structure, the thickness of the radio wave absorbent at which the necessary performance is obtained is determined by the material of which the radio wave absorbent is constructed. It is thus required to use a radio wave absorbent material having a smaller matching thickness so as to reduce the amount of the radio wave absorbent used. Especially in the case of an exterior material for a building or bridge, a large amount of radio wave absorbents is needed. For instance, a matching thickness decrease of 0.1 mm means that some considerable amount of radio wave absorbents can be saved. As an example, a matching thickness increase of 0.1 mm is tantamount to a weight increase of 5 tons in the case of an outer wall of 10,000 $m^2$. Especially when weight is a predominant factor in determining the strength and performance of a structure like a bridge, the weight reduction is a great problem to be solved; even a matching thickness decrease or increase of 0.1 mm or less is of significant importance. For this reason, it is required to achieve a matching thickness decrease of 0.1 mm even at the lowest.

When a radio wave absorbent is used as an exterior material for a structure, it is required to have a high Curie point. More specifically, when a radio wave absorbent is used as an exterior material for a building or the like, it is preferable to have a Curie point of 80° C. or higher in view of an ambient temperature as well as heat from direct sunlight. Another consideration in this regard is the influence of heat generated due to friction.

It is therefore an object of the present invention to provide a radio wave absorbent which is particularly suitable for use as an exterior material for a building or the like, has a smaller matching thickness and is excellent in chipping resistance so that it is unlikely to fail upon processing or execution, and has a practically high-enough Curie point.

SUMMARY OF THE INVENTION

Table 1 shows a matching thickness of a radio wave absorbent due to a composition difference, a frequency range at which reflection loss exceeds 20 dB, and a Curie temperature of the radio wave absorbent.

TABLE 1

| $Fe_2O_3$ (mol %) | ZnO (mol %) | CuO (mol %) | NiO (mol %) | Matching Thickness (mm) | Reflection Loss >20 dB (MHz) | Curie Temp. (° C.) |
|---|---|---|---|---|---|---|
| 49.2 | 32.9 | 7.2 | 10.7 | 6.4 | 40–435 | 95 |
| 49.0 | 34.5 | 3.2 | 13.3 | 7.4 | 45–400 | 85 |
| 49.2 | 32.4 | 8.2 | 10.2 | 6.4 | 50–435 | 100 |
| 49.2 | 33.4 | 5.7 | 11.7 | 6.9 | 40–405 | 95 |
| 49.2 | 31.4 | 7.2 | 12.2 | 5.7 | 65–480 | 125 |
| 49.4 | 35.5 | 2.8 | 12.3 | 9.1 | 40–325 | 65 |
| 49.2 | 32.0 | 10.2 | 8.6 | 6.9 | 55–420 | 105 |
| 49.0 | 34.0 | 2.8 | 14.2 | 6.3 | 60–440 | 95 |

From Table 1, it is found that the optimum composition range is:

$Fe_2O_3$: 49 to 50 mol % with the exception of 50 mol %

ZnO: 32 to 35 mol %

CuO: 3 to 9 mol %

NiO: 9 to 14 mol %

Thus, the aforesaid object of the invention is achieved as defined below.

(1) A radio wave absorbent comprising an Ni—Cu—Zn base ferrite having a major composition comprising an iron oxide, a zinc oxide, a copper oxide and a nickel oxide in the following amounts, calculated as $Fe_2O_3$, ZnO, CuO and NiO, respectively:

$Fe_2O_3$: 49 to 50 mol % with the exception of 50 mol %

ZnO: 32 to 35 mol %

CuO: 3 to 9 mol %

NiO: 9 to 14 mol % and further containing an additive molybdenum oxide in an amount, calculated as $MoO_3$, of 0 to 0.10 wt % with the exception of 0 wt % and on condition that the total amount of the major composition is 100 wt %.

(2) The radio wave absorbent of (1), which is an exterior material for a structure.

(3) The radio wave absorbent of (1), which is an interior material for a building.

DESCRIPTION OF THE PREFERRED EMBODIMENTS

Figure 1:
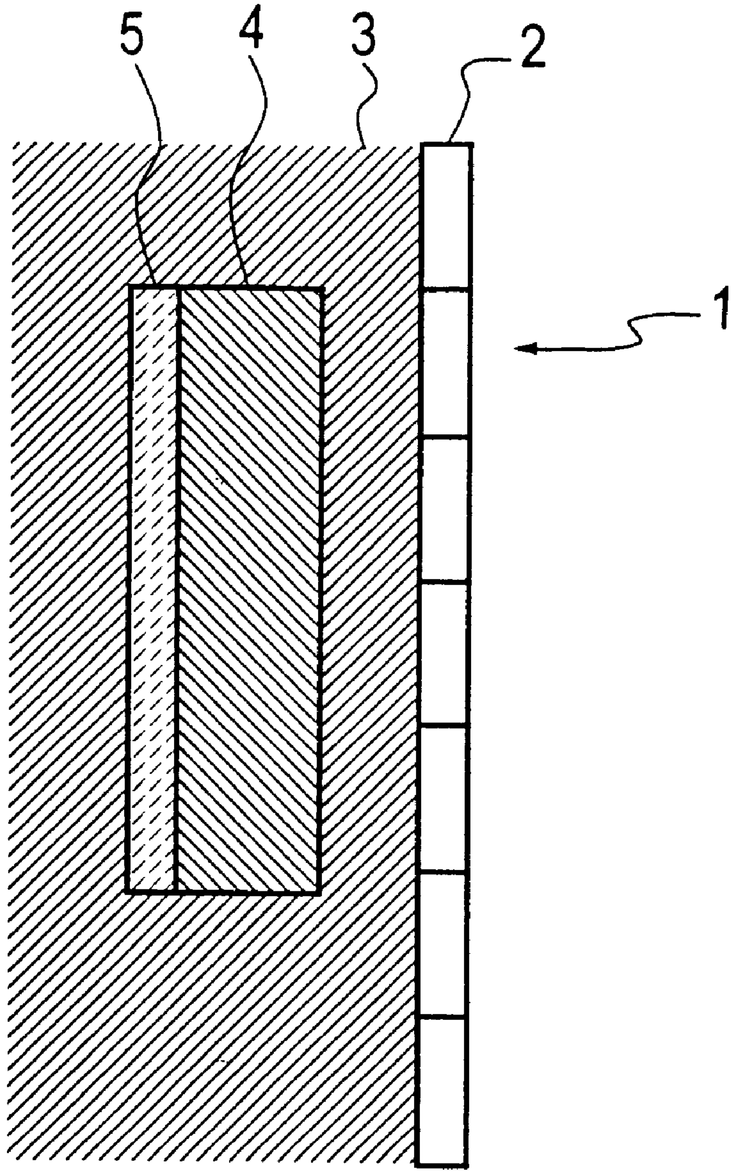
FIG. 1 is a fragmentary sectional view of an example of the radio wave absorbent of the invention in use.

The present invention provides a radio wave absorbent comprising an Ni—Cu—Zn base ferrite having a major composition comprising an iron oxide, a zinc oxide, a copper oxide and a nickel oxide in the following amounts, calculated as $Fe_2O_3$, ZnO, CuO and NiO, respectively:

$Fe_2O_3$: 49 to less than 50 mol %

ZnO: 32 to 35 mol %

CuO: 3 to 9 mol %

NiO: 9 to 14 mol % and further containing an additive molybdenum oxide in an amount, calculated as $MoO_3$, of greater than 0 to 0.10 wt % with the proviso that the total amount of the major composition is 100 wt %. In such a composition range there is obtainable a radio wave absorbent having a small matching thickness and an improved chipping resistance. By the term "matching thickness" used herein is intended the thickness of a radio wave absorbent at which there is a particular frequency (matching frequency fm) not perfectly reflected by the radio wave absorbent. Hereinafter, the matching thickness will be designated by dm.

The amount of the iron oxide in the major composition is 49 to less than 50 mol %, preferably 49.0 to 49.9 mol %, and especially 49.4 to 49.5 mol %, calculated as $Fe_2O_3$. An $Fe_2O_3$ content of less than 49 mol % is not preferable because the frequency characteristics of the radio wave absorbent deteriorates due to a non-magnetic phase increase. An $Fe_2O_3$ content exceeding 50 mol % is again not preferable because of a drastic sinterability drop.

The amount of the zinc oxide is preferably 32 to 35 mol %, and especially 32 to 33.5 mol %, calculated as ZnO. A ZnO content of less than 32 mol % is not preferable because the range of frequency absorbed by the radio wave absorbent is shifted to a higher frequency side. A ZnO content exceeding 35 mol % is again not preferable because the Curie temperature of the radio wave absorbent becomes low.

The amount of the copper oxide is preferably 3 to 9 mol %, and especially 5 to 8 mol %, calculated as CuO. A CuO content of less than 3 mol % is not preferable because of a sinterability drop. A CuO content exceeding 9 mol % is again not preferable because the frequency absorbed by the radio wave absorbent is shifted to a higher frequency side.

The amount of the nickel oxide is preferably 9 to 14 mol %, and especially 10 to 12 mol %, calculated as NiO. An NiO content of less than 9 mol % or exceeding 14 mol % is not preferable because the frequency absorbed by the radio wave absorbent is shifted to a high frequency side.

The molybdenum oxide added to the Ni—Cu—Zn ferrite having the aforesaid major composition is usually $MoO_3$. In the invention, however, it may deviate from the composition $MoO_3$. It is desired that the amount of the molybdenum oxide added is greater than 0 wt % to 0.10 wt %, preferably 0.01 to 0.08 wt %, and especially 0.02 to 0.05 wt %, calculated as $MoO_3$, on condition that the total amount of the major composition is 100 wt %. The more the amount of $MoO_3$ added, the more improved the chipping rate is. When the amount of $MoO_3$ added exceeds 0.10 wt %, however, there is a matching thickness increase. The molybdenum oxide added usually exists at grain boundaries although it may be present in grains. It is noted that the grain size is about 5 μm.

Reference will then be made to how to produce the radio wave absorbent of the invention.

Starting oxides are first mixed together as usual, e.g., in a wet ball mill, such that the composition ranges of $Fe_2O_3$, NiO, CuO and ZnO have the following values.

$Fe_2O_3$: 49 to less than 50 mol %

ZnO: 32 to 35 mol %

CuO: 3 to 9 mol %

NiO: 9 to 14 mol %

At this time, the average particle size of each oxide material is preferably in the range of 0.5 to 1.5 μm, as determined by subsieve sizing. Then, a molybdenum oxide, preferably $MoO_3$, is added to the mixture in an amount of not greater than 0.10 wt % (with the exception of 0 wt %). The mixture is then calcined preferably at 800 to 1,000° C. for about 2 hours in an atmospheric environment. Note that this calcination may be omitted. The resulting calcined product is pulverized, and formed into a core of given shape at a forming pressure of about 0.1 to 1 ton/$cm^2$, which is in turn fired at 1,000 to 1,200° C. for about 2 hours. The resultant fired produce is finally processed into a radio wave absorbent.

An account will then be given of how to use such a radio wave absorbent.

FIG. 1 is a fragmentary sectional view illustrative of a preferable use embodiment of the radio wave absorbent. As shown, a structure 1, which may be in the form of a building, bridge, smokestack, tower or mobile body, is built up of a facing material 2 such as glazed tiles, a structural material 3 such as a concrete, resin or metal material, and a radio wave absorbent 4 optionally with a metal lining material 5. These materials constitutes an integral structure generally called an exterior material. By providing the radio wave absorbent 4 in the side wall or the like (exterior structure) of a building or the like in this manner, it is possible to prevent wave interferences, typically ghosts in the case of a television and multipath errors in the case of an FM radio. It is noted that the metal lining material 5 has actions on the reinforcement of the radio wave absorbent 4 and improvements in reflection losses, and that it may be selected from an iron sheet, aluminum sheet or other similar sheet depending on radio wave bands where wave reflection must be avoided, the type of structure, etc. The facing material 2 may be dispensed with, if required. For instance, the radio wave absorbent 4 of the invention or the structural material 3 may be used as the facing material 2. When the radio wave absorbent 4 of the invention is used as the facing material, it is possible to dispense with a part of the structural material 3. In this case, however, it is preferable to polish the surface of the radio wave absorbent 4 so as to provide it with a resin coating, if required. It is noted that the surface of the radio wave absorbent 4 may not necessarily be in a smooth form, and so may be provided with asperities to improve the efficiency of wave absorption.

In the invention, it is noted that the size of the radio wave absorbent is not particularly critical. For instance, when it is used in the form of a rectangular sheet to be provided in the outer wall of a building or the like, its size may usually be of the order of 50×100 mm to 100×100 mm and its thickness may usually be of the order of 4.5 to 8.5 mm. A distance from the surface of the facing material 2 to the surface of the radio wave absorbent 4 may usually be of the order of 0 to 30 cm, and the size of the metal lining material 5 may be similar to that of the radio wave absorbent 4, with its thickness lying usually in the range of 0.2 to 5 mm.

While the radio wave absorbent of the invention has been described with reference to an exterior material for a building or other structure, it is understood that the present absorbent may also be applied to a cylindrical structure such as a smokestack, tower or mast. In this case, the radio wave absorbent may be processed in conformity to the contour of the structure. The radio wave absorbent of the invention may be applied to not only an exterior material for structures but also an interior material for an anechoic chamber or other structure. In this case, an interior material such as wood, resin, and particle board may be used in place of the exterior material of FIG. 1. As mentioned above, parts of the interior material and structural material may be dispensed with. The anechoic chamber may be typically used for antenna, and radio wave carrier tests, and for control, etc. of high precision communications equipment.

The present invention will now be explained at great length with reference with examples.

EXAMPLE 1

Raw materials $Fe_2O_3$, NiO, CuO and ZnO for the major composition were weighed and mixed together such that the final composition was provided by the following major composition 1. The additive $MnO_3$ was added to the mixture in such an amount of 0.015 to 0.150 wt % per 100 wt % of the major composition, as shown in Table 2. The particle size of each starting material used was in the range of 0.5 to 1.5 μm as determined by subsieve sizing. The aforesaid respective starting materials were mixed together in a wet ball mill. The resulting mixture was dried, and then calcined at 900° C. for 2 hours in an atmospheric environment. After calcination, the calcined product was pulverized, and formed into a columnar core of 25.4 mm in diameter at a forming pressure of about 1.0 ton/cm$^2$. The core was then fired at a firing temperature of 1,000 to 1,100° C. for 2 hours. The resulting sintered product was processed into a toroidal core or a radio wave absorbent of the invention having an outer diameter of 19.8 mm, an inner diameter of 8.7 mm and a height of 5.5 to 9.0 mm.

Major Composition 1

$Fe_2O_3$: 49.45 mol % (66.22 wt %)

ZnO: 32.35 mol % (22.08 wt %)

CuO: 7.25 mol % (4.84 wt %)

NiO: 10.95 mol % (6.86 wt %)

The obtained radio wave absorbent core was measured by a network analyzer to find its matching thickness. The results are shown in Table 2.

The columnar core was rotated in a three-pot mill arrangement at 100 rpm for 30 seconds to find a core chipping rate from a weight change before and after rotation, as defined below. The results are shown in Table 2.

$$\text{Chipping rate } (\%) = 100 \times (1 - W/W_0)$$

where $W_0$ is the core weight in gram before rotation, and W is the core weight in gram after rotation.

Radio wave absorbents with varying matching thicknesses, each in a flat sheet form, were cut to 100×100 mm. How many absorbents failed upon cutting was estimated. The failure rate is herein given by the ratio of failures with respect to all the absorbents used for cutting. The results are shown in Table 2. It is noted that all the absorbents had a Curie temperature of 95° C. or higher.

TABLE 2

| $MoO_3$ Content (wt %) | Matching Thickness (mm) | Reflection Loss (dB) 50 Mhz | Reflection Loss (dB) 400 Mhz | Chipping Rate (%) | Failure Rate (%) | Curie Temperature (° C.) |
|---|---|---|---|---|---|---|
| 0 | 6.4 | 20 | 22 | 1.50 | 10 | 95 |
| 0.015 | 6.2 | 20 | 22 | 1.40 | 5 | 95 |
| 0.035 | 6.0 | 20 | 22 | 1.33 | 3 | 95 |
| 0.070 | 6.1 | 20 | 22 | 0.81 | 1 | 95 |
| 0.090 | 6.2 | 20 | 22 | 0.60 | 0 | 95 |
| 0.150 | 6.5 | 20 | 22 | 0.19 | 0 | 95 |

The radio wave absorbent having a matching thickness of 6.1 mm selected from the obtained flat form of radio wave absorbents was used as an exterior material for a building. Satisfactory results were obtained; neither ghosts nor multipath errors were found.

EXAMPLE 2

Samples were prepared following Example 1 with the exception that the major composition was changed from 1 to the following ranges:

$Fe_2O_3$: 49 to less than 50 mol %

ZnO: 32 to 35 mol %

CuO: 3 to 9 mol %

NiO: 9 to 14 mol %

The samples were estimated as in Example 1. The results are found to be substantially similar to those of Example 1.

Thus, the present invention can provide a radio wave absorbent which is particularly suitable for use as an exterior or interior material for a building or the like, has a smaller matching thickness and is excellent in chipping resistance so that it is unlikely to fail upon processing or execution, and has a practically high-enough Curie point.

Although some preferred embodiments have been described, many modifications and variations may be made thereto in the light of the above teachings. It is therefore to be understood that within the scope of the appended claims, the invention may be practiced otherwise than as specifically described.

Japanese Patent Application No. 9-38422 is herein incorporated by reference.

What we claim is:

1. A radio wave absorbent comprising an Ni—Cu—Zn base ferrite having a major composition comprising an iron oxide, a zinc oxide, a copper oxide and a nickel oxide in the following amounts, calculated as $Fe_2O_3$, ZnO, CuO and NiO, respectively:

$Fe_2O_3$: 49 to 50 mol % with the exception of 50 mol %

ZnO: 32 to 35 mol %

CuO: 3 to 9 mol %

NiO: 9 to 14 mol % and further containing an additive molybdenum oxide in an amount, calculated as $MoO_3$, of 0 to 0.10 wt % with the exception of 0 wt % and on condition that the total amount of the major composition is 100 wt %.

2. The radio wave absorbent of claim 1, which is an exterior material for a structure.

3. The radio wave absorbent of claim 1, which is an interior material for a building.

* * * * *